United States Patent [19]

Herman et al.

[11] 4,308,416

[45] Dec. 29, 1981

[54] WATER-TIGHT ELECTRIC CABLE

[75] Inventors: Daniel F. Herman, Princeton; Uno Kruse, Neptune, both of N.J.

[73] Assignee: NL Industries, Inc., New York, N.Y.

[21] Appl. No.: 217,495

[22] Filed: Dec. 17, 1980

Related U.S. Application Data

[63] Continuation of Ser. No. 56,563, Jul. 11, 1979, abandoned.

[51] Int. Cl.[3] .................... B32B 15/00; B32B 27/00; H01B 7/28

[52] U.S. Cl. .............................. 174/23 C; 428/372; 428/377; 428/378; 428/383

[58] Field of Search ............... 428/375, 378, 379, 383, 428/372, 377; 174/23 C, 23 R; 526/312, 317

[56] References Cited

U.S. PATENT DOCUMENTS

| | | | |
|---|---|---|---|
| 3,971,766 | 7/1976 | Ono et al. | 526/317 |
| 4,002,819 | 1/1977 | Woytiuk | 174/23 C |
| 4,004,077 | 1/1977 | Woytiuk | 174/23 C |
| 4,041,231 | 8/1977 | Gross et al. | 526/317 |

*Primary Examiner*—Lorraine T. Kendell
*Attorney, Agent, or Firm*—Gary M. Nath

[57] ABSTRACT

Insulated electrical devices protected against entry and migration of water, said electrical devices containing solid water-swellable, water-insoluble polymers prepared by crosslinking an olefinically-unsaturated carboxylic acid with an alkyl acrylate.

3 Claims, 1 Drawing Figure

WATER-TIGHT ELECTRIC CABLE

Figure 1:
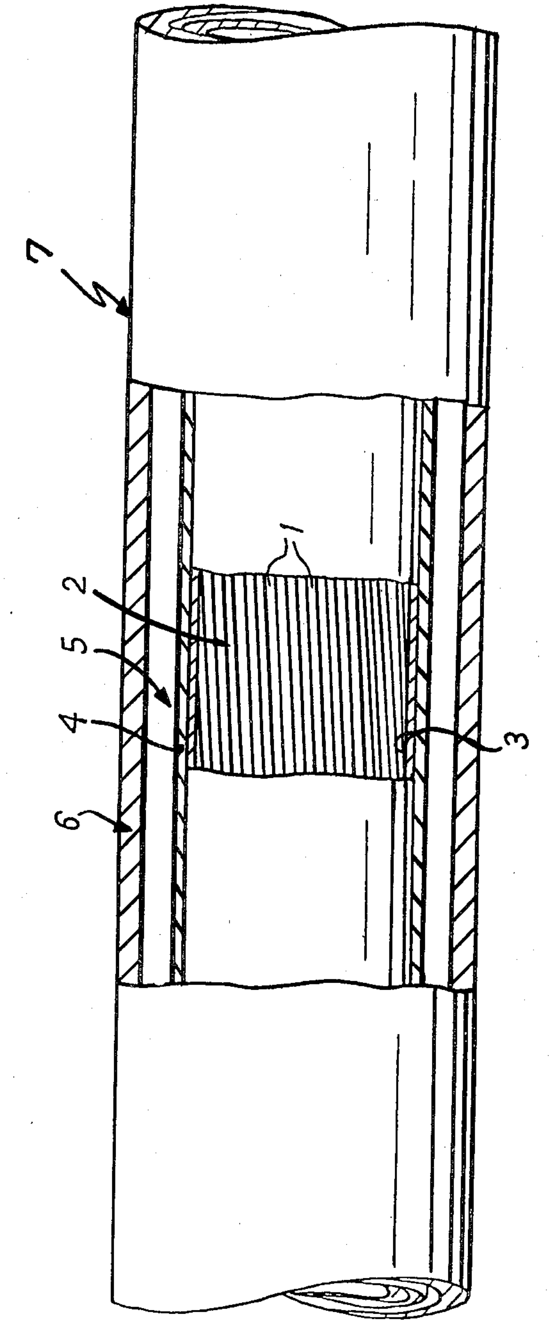

This is a continuation of application Ser. No. 56,563, filed July 11, 1979, now abandoned.

This invention relates to insulated electrical devices protected against the entry and migration of water, and particularly to insulated electrical devices containing a novel solid, water-swellable, water-insoluble polymer.

Water penetration of insulated electrical devices and especially plastic insulated multiconductor telephone cables can seriously effect the electrical properties of such structures. The problem of water penetration is amplified when the electrical device is positioned underground or in a high humidity environment. In the case of a telephone cable, water penetration can seriously impair the electrical and mechanical properties that are critical to its continued operation. The entrance of water between insulated conductors can cause a significant increase in their capacitance and can lead to the development of electrical leakage pathways between conductors having pinhole insulation defects. Leakage of water into the unoccupied spaces between the insulated cable pairs and the outer sheath can also cause a significant increase in signal attenuation, noise, and lead to conductor corrosion.

Curtailment of water penetration has been attempted by various means such as by employing during manufacture a filling between the interstices and around the conductors with a jelly or greaselike material. Such materials have various disadvantages which limit their utility and effectiveness.

It has been proposed to replace the jelly or greaselike material with a powder filling that swells on contact with water, thus blocking further water penetration. German Pat. No. 2,007,163 discloses the use of materials yielding high viscosity solutions or gels with water. Exemplary materials are natural water-swelling macromolecular materials such as cellulose derivatives, e.g., methylcellulose, hydroxyethylcellulose and carboxymethylcellulose. Such materials, however, are subject to microbial attack which leads to the inability of the material to swell when contacted with water. Other synthetic water-swelling materials are disclosed such as polyvinyl alcohols which contain acetate groups or polyacrylamides. Certain of these synthetic resins, however, do not swell rapidly enough in cold water to effect satisfactory sealing to curtail further water penetration.

In U.S. Pat. No. 4,002,819 a mixture of a water repellent treated calcium carbonate and at least one high molecular weight resin rapidly hydratable to form a viscous solution is disclosed. Various resins are suggested, such as irradiation induced crosslinked polyacrylamide, irradiated polyethylene oxide and a hydrolyzed starch graft polymer of polyacrylonitrile. In contrast U.S. Pat. No. 4,004,077 discloses the use of a mixture of a hydrophobic powder and a hydrophilic powder, the hydrophilic powder forming on contact with water a viscous, non-swelling material, the conductors being coated with the hydrophobic oil.

Broadly, the present invention provides an insulated electrical cable having a core of a plurality of conductors and a jacket, the interstices between the conductors and within the jacket being at least partially filled with a novel water-swellable, water-insoluble polymer. The polymer may be used in the form of a powder or cable paper, paper fiber composition or other synthetic material.

The attached illustration demonstrates the embodiments of the invention.

The FIGURE is a front elevational view, partly in section, of a length of plastic insulated multiconductor telephone cable.

In the cable illustrated in FIG. 1, a cable 7 is shown comprising a plurality of insulated conductors 1 disposed within the central core 2 of the cable. The plurality of insulated conductors 1 may be covered with a coating 3 such as a wrapping containing the novel polymer or polymer powder dispersed over the conductor bundles to fill at least some of the voids between the conductors. The conductors may then be enclosed within a spiral wound sheath 4, such as a polyethylene terephthalate sheet material. Surrounding the sheath is a protective shield 5 made of flexible metal sheeting, such as aluminum. Finally, an outer jacket 6 of suitable protective material such as polyurethane or other plastic material serves to protect the cable.

Aqueous contaminants generally find their way into the cable through pinholes and stress cracks that develop around fittings and cable connectors, ultimately lodging in the interior free spaces of the cable's central core. After a particular aqueous contaminant, for example water or a saline composition, has been present for some time in the core, the electrical properties of the cable can be deleteriously effected.

By use of the polymer fillers of this invention it is not necessary to completely fill the voids in the bundles of conductors making up the cable. It has been found that the ingress and penetration of water or saline solution into the cable core is effectively blocked by polymer absorption and concomitant swelling. The polymer prevents penetration and water spreading without impairing the flexibility of the cable.

In one aspect of the invention the polymers are conveniently used by applying the polymer in dried powder form to the insulated conductors to fill at least some of the voids between the conductors prior to wrapping the core. The insulated conductors may be previously coated with a hydrocarbon oil such as mineral oil or lubricating oil. Once wrapped, additional amounts of polymer powder may be used with the metal sheath to form a layer interposed between the core wrap and the shield.

Alternatively the polymer may be applied in the form of a cable paper, paper-fiber composite or other synthetic material, which materials are coated or impregnated with the polymers. Such materials may be prepared by methods well known in the paper coating art. Such materials may be wrapped around the cable core either before or after the core is wrapped with a sheath. Multiple wrappings may also be employed, if necessary, to separate the core from the outer coverings, such as sheath, metal shield and jacket. Multiple combinations using both polymer powder and polymer containing wrappings may also be used.

The amount of polymer employed in the cable is critical to the extent that sufficient amounts must be employed to block water penetration and movement within the cable without resulting in cable breakage as a result of polymer swelling. It has been found that the polymers of this invention are effective when employed in amounts of 1 to 10% of the void volume, preferably 2 to 6% of the void volume.

Preparation of the polymers of this invention as well as articles containing them is particularly set forth in copending application entitled *Polymeric Polyelectrolytes* filed July 11, 1979 as Ser. No. 56,564. As specifically recited in this copending application, the polymer comprises (a) from about 15% to about 50% by weight of an olefinically-unsaturated carboxylic acid; (b) from about 49.07% to about 82% by weight of an alkyl acrylate wherein the alkyl group has from 1 to 4 carbon atoms; and (c) from about 0.03% to about 3.0% by weight of a crosslinking agent. All indicated amounts are by weight and based upon the total weight of the components of the polymer.

Also provided is an alkaline salt and organic amine salt of the above-defined polymer which materials are useful as a water absorbing agent. Exemplary alkaline salts may be selected from sodium, potassium, lithium and ammonium. Exemplary organic amine salts may be selected from trimethyl amine and triethanol amine.

In the production of the polymers of this invention, a monomeric mixture which contains an olefinically-unsaturated carboxylic acid and an alkyl acrylate is polymerized in the presence of minor amounts of a vinyl crosslinking agent. Crosslinking is achieved by introducing the vinyl groups of the crosslinking agent directly into the carbon-carbon backbone of the polymer. Where long term resistance to degradation is required, hydrolytically stable crosslinking agents such as divinyl benzene or triallylcyanurate may be employed.

The olefinically-unsaturated carboxylic acids useful in the invention are those materials containing an activated carbon-to-carbon olefinic double bond and at least one carboxyl group, that is an acid containing an olefinic double bond. Representative examples of suitable carboxylic acids include acrylic acid, methacrylic acid, ethacrylic acid, crotonic acid, muconic acid, aconitic acid and similar compounds as well as mixtures thereof. The preferred carboxylic acids are acrylic acid and methacrylic acid.

The alkyl acrylates useful in the invention are those alkyl acrylates wherein the alkyl group has from 1 to 6 carbon atoms and preferably 1 to 4 carbon atoms. Representative examples of suitable acrylates include methyl acrylate, ethyl acrylate, propyl acrylate, n-butyl acrylate and iso-butyl acrylate. The preferred acrylates are methyl acrylate, ethyl acrylate and n-butyl acrylate with methyl acrylate being most preferred. Higher chained acrylates have a tendency to become hydrophobic causing the final polymer salt to exhibit lower swelling and water absorption in water and saline solutions.

Other monomers, which do not fall within the description of the monomers described above may be employed in minor amounts, that is up to about 8% by weight, provided they do not adversely affect the basic and novel characteristics of the polymers of this invention. For example, acrylamide, 2-ethylhexyl acrylate, hydroxyethyl acrylate and hydroxyethyl methacrylate may be employed as partial replacement for methyl acrylate or ethyl acrylate, and itaconic acid, maleic acid or maleic anhydride employed as partial replacement for methacrylic acid or acrylic acid.

The crosslinking technique used to transform water-soluble polymers into insoluble, water-swellable salt polymers is well known as free radical addition polymerization. Crosslinking agents usable according to the invention are polyunsaturated polymerizable vinyl monomers containing two or more free radical polymerizable ethylenic groups. Substantially any monomer having more than one polymerizable ethylene group can be used which monomer must be able to enter into vinyl addition polymerization reactions with the foregoing mentioned acids and acrylates. Illustrative examples include:

(1) diacrylate esters and dimethacrylate esters of glycols such as ethylene glycol dimethacrylate, propylene glycol dimethacrylate, butylene glycol dimethacrylate and hexylene glycol dimethacrylate;

(2) diacrylate esters and dimethacrylate esters of ether or polyether glycols such as diethylene glycol diacrylate, diethylene glycol dimethacrylate, triethylene or tetraethylene glycol diacrylate and triethylene or tetraethylene glycol dimethacrylate;

(3) allyl esters of polymerizable unsaturated carboxylic acids such as allyl acrylate, methallyl acrylate, allyl methacrylate, allyl ethacrylate, ethallyl acrylate, methallyl methacrylate;

(4) di or trivinyl aromatic compounds such as divinyl benzene, and trivinyl benzene;

(5) di or triallyl esters of di and tribasic acids such as diallyl phthalate, triallyl cyanurate, diallyl maleate, diallyl succinate, triallyl phosphate, diallyl oxalate, diallyl malonate, diallyl citrate, diallyl fumarate, diallyl ether; and (6) acrylate or methacrylate esters of polyols such as di or triacrylate or methacrylate esters of trimethylol ethane, trimethylol propane or pentaerythritol.

In order to achieve the desired polymer properties, it is important that the monomers be polymerized together in certain specified proportions, although the exact proportions will vary depending on the polymer characteristics desired. The olefinically-unsaturated carboxylic acids of the invention are employed in amounts of from about 15% to about 50% by weight and most preferably from about 20% to about 40% by weight, based on the total weight of the monomers used. If the amount of carboxylic acid employed exceeds about 50% by weight, the resulting polymer salt becomes excessively hydrophilic while absorbing excessive amounts of water leading to a (1) soluble polymer, (2) viscous solution or suspension, and (3) loss of polymeric structural integrity. If the amount of carboxylic acid is less than about 15%, the resulting polymer salt is insufficiently hydrophilic and exhibits poor water absorption.

The alkyl acrylates are employed in amounts of about 49.07% to about 82% by weight and most preferably from about 59.02% to about 78% by weight, based on the total weight of the monomers used. If the amount of the acrylate employed exceeds about 82% by weight, then the resulting polymer in salt form is insufficiently hydrophilic and exhibits poor water absorption. If the amount of acrylate is less than about 49.07%, the resulting polymer becomes excessively hydrophilic while absorbing excessive amounts of water leading to a (1) soluble polymer, (2) viscous solution or suspension, and (3) loss of polymeric structural integrity.

The amount of crosslinking agent employed is desirably limited to an amount from about 0.03% to about 3.0% by weight, preferably from about 0.08% to about 2.0%. This low amount of crosslinking agent has been found sufficient to render the polymer salt water-insoluble while retaining a high degree of water absorbency. Use of less than 0.03% results in a polymer which upon neutralization functions primarily as a thickening agent lacking discrete particle identity. As the amount of crosslinking agent is increased above 0.03%, the more discrete and rigid the resulting polymer becomes rendering expansion of the salt particles less possible.

Water absorbency drops to a commercially unacceptable level when amounts greater than 3.0% crosslinking agent are used.

The preferred polymer is prepared from a mixture containing as essential ingredients from about 20% to about 40% by weight of an olefinically-unsaturated carboxylic acid selected from methacrylic acid and acrylic acid; from about 59.02% to about 78% by weight of an alkyl acrylate selected from methyl acrylate, ethyl acrylate and n-butyl acrylate, and from about 0.08% to about 2.0% by weight of a cross-linking agent.

The polymeric constituents should be reacted as completely as possible during polymerization. The polymer may be made by conventional polymerization techniques such as by solution, suspension or emulsion polymerization on a batch, continuous or semi-continuous basis.

Suspension polymerization is preferred since this technique results in an acid polymer product as a high surface area granular precipitate having an average particle size between 50 and 400 microns, which product appears to be composed of accretions of smaller particles in the 10 to 50 micron range. A large proportion of these smaller particles appear as high surface area donuts of collapsed spherical shapes with 2 to 5 micron protuberances on their surfaces.

The polymerization reaction is carried out in the presence of a catalyst. The catalysts which form free radicals necessary for the reaction are conventional and are usually organic peroxides, inorganic persulfates and free radical generating azo compounds. The amount of catalyst used is normally from about 0.01 to about 2.0 parts by weight per 100 parts by weight of the total monomeric material to be reacted. Representative examples of organic peroxides include benzoyl peroxide, acetyl peroxide, bis(p-bromobenzoyl)peroxide, di-t butyl peroxide, t-butyl hydroperoxide, dicumyl peroxide, cumene hydroperoxide, bis(p-methoxybenzoyl)-peroxide, 2,2'-azobisisobutyronitrile and the like. Exemplary inorganic persulfates include ammonium, sodium and potassium persulfates. These may be used alone or in conjunction with sodium or potassium bisulfite. While polymerization is preferably carried out with a free radical catalyst, radiation induced polymerization can also be employed such as high energy X-rays or gamma rays.

Suitable conventionally employed surface active agents and/or colloids may also be used during the polymerization reactions.

Polymerization times, and temperatures may vary considerably depending on the monomer system and catalyst used. The polymerization reaction will generally be completed within at least 30 minutes to several hours at temperatures from around 0° C. to 100° C. and preferably within 1 to 4 hours at 65° C. to 90° C. for maximum efficiency.

In the preferred embodiment suspension polymerization is conducted in the following manner. A reactor is charged with deionized water and a suspension agent and deaerated with an inert gas. The reactor may be optionally heated to dissolve the suspension agent. Previously determined amounts of olefinically-unsaturated carboxylic acid and alkyl acrylate are added either separately or in admixture. Addition may occur at room temperature or at the reaction temperature. The cross-linking agent and catalyst may be added simultaneously with the monomer mixture or separately.

The reactor contents are then agitated by conventional means and heated to commence polymerization at a temperature around the lowest boiling point of the monomers. When methyl acrylate is polymerized, this temperature is about 70° C. The reaction is then allowed to continue to polymerize to completion whereupon the reactor contents are cooled. The polymer product may be alternately recovered from the slurry by conventional filtration means or directly converted in the slurry to its salt form. The final product slurry can be steam-treated at about 100° C. to remove any traces of unreacted monomers. Alternately, a highly reactive redox catalyst is added to essentially provide a 100% yield. The slurry can then be filtered to recover the polymer in its non-swelling acid form or neutralized by adding to the final slurry calculated amounts of an aqueous alkaline solution to convert the free acid groups to the salt form. Alternatively, the filtered polymer cake may be redispersed in water and neutralized as above or dried, pulverized and then neutralized with alkali.

Typically the solids content of the final reaction mixture is from about 15% to about 50%. Lower solid contents can be used but are generally undesirable from an economic standpoint.

The resulting polymer products in dried or slurry form may then be stored or used directly in an absorbent article such as by treating a substrate. For example, the article which may be a substrate is treated with the acid polymer which is then neutralized with an alkaline solution to form a water-swellable polymer by conventional neutralization methods. It is to be understood that the treating step implies a complete particle dispersion on the substrate or discontinuous dispersion. The substrates to be treated may vary widely depending on the end use but include fibrous substrates such as wood pulp, cellulose batting, paper, woven or non-woven cloth and the like.

Any suitable organic or inorganic base may be used during neutralization. Representative compounds include sodium hydroxide, potassium hydroxide, lithium hydroxide, ammonium hydroxide, ammonia, and sodium carbonate. Neutralization may also be achieved with organic amines such as ethanolamine, diethanolamine, triethanolamine, methyl diethanolamine, butyl diethanolamine, diethyl amine, dimethyl amine, trimethyl amine, triethyl amine, tributyl amine, and so forth, and mixtures thereof. The most preferred base is sodium hydroxide. In short, any basic material may be used which does not adversely affect the polymer composition.

It is critical in the process of the invention, and particularly during neutralization reaction to employ the minimum quantity of water required to effect complete and uniform reaction and neutralization. Effective amounts of water usable in the invention have been found to range from a weight ratio of about 4 to 10:1 and preferably about 5 to 7:1 for total water to polymer ratio. When a ratio of less than 4:1 is employed, there is a danger that all of the free water will be rapidly absorbed during neutralization by only a portion of the acid polymer as it is neutralized leaving little if any water to conduct the remaining neutralizing agent to unneutralized acid polymer particles. On the other hand, a ratio above 10:1 results in excessive energy expenditures during drying to remove the unnecessary large amount of absorbed water.

In order to effect complete neutralization, stoichiometry should be observed between the equivalents of base dissolved in the alkaline neutralizing solution and the carboxylic acid equivalents in the polymer slurry. Thus, at least one equivalent of base, such as sodium hydroxide, per equivalent of carboxylic acid containing monomer moiety should be employed. However, as much as a 20 equivalent percent excess of base may be employed to insure that all the carboxylic acid groups are reached by the neutralizing solution. In fact, a slight excess is desirable to drive the reaction and achieve maximum swelling. The excess alkalinity is not harmful since it reacts upon drying by partially saponifying the acrylate ester segments, particularly the methyl acrylate, to yield additional sodium acrylate monomer units in the polymer chain backbone.

Drying of the polymer salt may be done by conventional means such as fluid bed drying, rotary kiln drying, tray drying, vacuum drying and oven drying, at sufficient temperatures to remove essentially all of the water associated with the polymer product without resulting in polymer decomposition. Products containing up to 5% residual absorbed water are acceptable materials. Preferred drying temperatures may be between 25° C. and 150° C. and most preferably between 80° C. and 100° C.

During drying, the polymer salt particles become agglomerated forming a friable mass of solid particles. This mass may be ground to form discrete particles for ease of handling and shipping.

It has been found that particles between about 50 microns and about 2 millimeters result in a particle that rapidly absorbs water and enables water to pass a mass of previously swollen particles to reach as yet untouched material. It should be recognized that as particle size increases the particle surface area to volume decreases which results in slower water absorption and ultimately larger swelled particles. Likewise, small particle size material when used in bulk tend to absorb water at a slower rate than larger particles as a result of decreased interparticle pore size and accordingly decreased percolation rate.

The polymer product of the invention has an indeterminate "weight average" molecular weight because of its crosslinking and insolubility in solvents commonly used in the determination of molecular weights. The neutralized polymer is capable of absorbing surrounding water many times its own weight. In doing so, each individual absorbent particle swells or enlarges several times its individual diameter without destruction of the particles' particulate integrity. Absorption of distilled water in amounts greater than 100× weight have been noted. In 1% sodium chloride solutions up to 30× weight increases have occurred whereas in 15% to 25% sodium chloride solutions up to 10× weight increases have been noted. This amount of absorption is significant, especially when it is recognized that the polymer particle substantially immobilizes the same therein and the resulting particulate material retains its structure integrity.

The water-insoluble, water-swellable polymer of this invention is preferably used in an absorbent dressing or article of manufacture requiring water retention ability. Such materials may contain up to 90% by weight polymer. The following examples are given to illustrate preparation of polymers used in this invention but are not deemed to be limiting thereof. All parts and percentages given are based upon total weight unless otherwise indicated.

The following procedure is employed in the examples where applicable to determine water and saline solution absorption. Add one gram of the polymer salt to 100 grams of a 1% NaCl solution or 200 grams distilled water. Allow to stand without agitation for two hours. Filter the material using a Whatman No. 4 filter paper until no water passes through (usually 5 to 15 minutes). Weigh the swollen product, substract the weight of the polymer, i.e. one gram, and report the results as swelling value. The rate of absorption is determined by adding one gram of the polymer salt into 30 grams distilled water in a small jar. The contents of the jar are stirred gently by shaking. The time necessary for the polymer to turn completely solid, that is, the product does not flow freely when the jar is inverted, is observed and recorded.

EXAMPLE 1

This Example illustrates a method for preparing the polymers used in this invention by the preferred suspension polymerization technique.

A polymerization reactor was charged with 2,000 grams of deionized water and 3 grams of Cellosize QP-4400 (product of Union Carbide which is a hydroxyethyl cellulose powder having a 2% viscosity of 4,000 to 6,000 cps) as a suspending agent. The contents of the reactor were heated to 65° C. until the hydroxyethyl cellulose dissolves and then cooled to 35° C.

To the reactor was then added with agitation, a mixture containing 325 grams methyl acrylate, 175 grams glacial methacrylic acid, 0.5 grams ethylene glycol dimethacrylate as crosslinking agent and 0.5 grams azobisisobutyronitrile as catalyst. The contents of the reactor were deaerated by purging with nitrogen which is passed therethrough at a moderate flow rate (e.g., 100 milliliters per minute). The temperature was raised to 70° C. and the mixture allowed to polymerize for three hours. In the last hour the reactor temperature was raised to 80° C. to complete the reaction. The total reaction time was three hours. The contents of the reactor was continuously agitated during the entire polymerization reaction.

Upon completion of the reaction, the reactor slurry was cooled to 25° C. and filtered by passing the slurry through a vacuum filter. The filter cake weighed 1,000 grams. To analyze the product and determine yield, a one-fifth portion of the filter cake is dried for 16 hours in a vacuum oven at 80° C. and ground to an average 40 mesh size (U.S. Standard Sieve size) to prepare a granular acid polymer containing approximately 34 to 36% methacrylic acid. The percent conversion of monomers to polymer product was 97.0%.

The remaining portions of the filter cake were neutralized with a basic solution of sodium hydroxide by separately dispersing each remaining one-fifth portion of the cake in 400 grams of deionized water followed by rapid and complete addition of 195 grams of a 10% sodium hydroxide solution (e.g., a 20% excess over the theoretical amount necessary to neutralize the polymer). The resulting masses were dried at 80° C. in a vacuum oven to remove contained water and then ground to a size to pass through a 20 mesh screen, U.S. Standard Sieve size.

The saline absorbency of the polymer salt was determined in a 1% sodium chloride solution. The filter cake weighed 24 grams which corresponds to a water pickup of 23 times its own weight. In the water absorbency test, water pickup of about 100 times the weight of the polymer was achieved.

EXAMPLE 2

This example illustraes a method for preparing the polymers of this invention and neutralizing the polymer slurry in the presence of various surfactants.

A polymerization reactor was charged with 2,000 grams of deionized water and 3 grams of Cellosize QP-4400 (product of Union Carbide which is a hydroxyethyl cellulose powder having a 2% viscosity of 4,000 to 6,000 cps) as a suspending agent. The contents of the reactor were heated to 65° C. until the hydroxyethyl cellulose dissolves and then cooled to 35° C.

To the reactor was then added with agitation, a mixture containing 325 grams methyl acrylate, 175 grams glacial methacrylic acid, 0.5 grams ethylene glycol dimethylacrylate as crosslinking agent and 0.5 grams azobisisobutyronitrile as catalyst. The contents of the reactor where then deaerated by purging with nitrogen which is passed therethrough at a moderate flow rate (e.g., 100 milliliters per minute). The temperature was raised to 70° C. and the mixture allowed to polymerize for three hours. In the last hour the reactor temperature was raised to 80° C. to complete the reaction. The total reaction time was three hours. The contents of the reactor was continuously agitated during the entire polymerization reaction.

Upon completion of the reaction, the reactor slurry was cooled to 25° C. The slurry was diluted with 500 grams water in order to allow better agitation and flow.

One-fifth aliquot portion (600 grams) of the slurry was transferred to a steel beaker and agitated very rapidly (3000 RPM) with a dispersator. To this was added 5% Aerosol OT as a surfactant (a dioctyl sodium sulfosuccinate from American Cyanamid). To the suspension was then added 195 grams of 10% NaOH and the slurry solidified at once into a soft swollen friable, granular mass. The weight ratio of water to polymer in the neutralization step was 6.76 to 1. The friable solid sodium polymer salt was then dried at 80° C. in a vacuum oven to remove contained water and then ground to a size to pass through a 20 mesh screen, U.S. Standard Seive size. The resulting dried product absorbed 100 times its weight in water. In a 1% NaCl solution, 21 times its weight was absorbed. The rates of absorption were 8 seconds and 21 seconds, respectively.

EXAMPLE 3

This example demonstrates the preparation of various absorbent wrappings containing the polymers of this invention useful in electrical cable.

A. 0.5 Grams of finely ground dry polymer salt from Example 1 was added slowly to a 250-gram slurry of defiberized cellulose containing 5 grams cellulose. After mixing for 2 minutes, the slurry was diluted in the headbox of a conventional Noble and Wood Laboratory Sheet Machine and formed into 12"×12" handsheet dried and tested for water absorbency.

The article contained 10% polymer salt. The dry paper absorbed 12 times its weight of water.

B. A polymer suspension, prepared according to Example 2 was diluted to 15% solids content and neutralized with 20 mole % excess of 10% NaOH solution. The neutralized polymer swelled and absorbed all of the water to form a solid, friable paste. This was then diluted with water to 0.5% solids. 100 Grams of the slurry was added to a 250-gram slurry of a beaten cellulose pulp containing 5 grams cellulose. This was also converted to a 12"×12" handsheet as discussed above and tested for water absorbency. The dry paper absorbed 6.6 times its weight of water.

C. Six sheets of 4"×10" pieces of paper toweling weighing 3.5 grams were layered upon one another in a stack and dusted evenly between the layers with 3.5 grams of finely ground polymer salt from Example 1. The resulting multilayered pad was sprayed with water mist until the weight increased to 20 grams. The wet pad was then dried at 80° C. to fuse the layers together. The pad was tightly rolled into an oblong shape, immersed in a 1% NaCl solution for a few minutes, and then pressed under 1.5 lbs./sq. in. pressure for 5 minutes to determine the extent of saline absorption. The pad absorbed 9 times its weight of 1% NaCl solution. A similar control towel processed as discussed without the polymer absorbed 3 times its weight of the saline solution.

COMPARATIVE EXAMPLES A to G

This example compares the water and saline solution absorption rates of various commercially available water-swellable, water-insoluble polymer products with the dried polymer salt prepared according to Example 1. The polymers tested and their known chemical description and results are set forth in Table I. The results indicate that the polymers of the invention are unexpectedly superior water-swellable, water-insoluble compositions.

In the example, comparative material A is identified commercially as AQUALON and is a product of Hercules Inc. Comparative material B is identified commercially as VITERRA-1 and is a product of Union Carbide Corporation. Comparative material C is identified commercially as VITERRA-2 and is a product of Union Carbide Corporation. Comparative material D is identified commercially as PERMASORB-10 and is a product of national Starch & Chemical Corporation. Comparative material E is identified commercially as PERMASORB-30 Comparative material F is identified commercially as H-SPAN and is a product of General Mills Chemicals, Inc. The material is produced under license from the U.S. Department of Agriculture. Comparative material G is identified commerically as DOW-FLAKE and is a product of Dow Chemical Company and prepared according to U.S. Pat. Nos. 3,980,663 and 3,993,616.

TABLE I

| | Absorption Times Dry Weight | |
|---|---|---|
| | Water | 1% NaCl |
| Inventive Product | 100 | 21 |
| Comparative A | 16 | 5 |
| fibers of internally crossinked sodium carboxymethylcellulose | | |
| Comparative B | 13 | — |
| crosslinked polyethylene oxide | | |
| Comparative C | Gelled mass. | Gelled mass. |
| acrylamide-Na acrylate copolymer | Cannot filter. | Cannot filter. |
| Comparative D | Gelled mass. | Gelled mass. |
| acrylic polymer with hydrophilic carboxylate | Cannot filter. | Cannot filter. |
| Comparative E | | |
| acrylic polymer with hydrophilic carboxylate groups | Cannot filter. | 20.4 |
| Comparative F | | |

TABLE I-continued

| | Absorption Times Dry Weight | |
|---|---|---|
| | Water | 1% NaCl |
| hydrolyzed starch polyacrylamide graft | Cannot filter. | Cannot filter. |
| Comparative G crosslinked salt of | Gelled mass. | Gelled mass. |
| linear carboxylic acid polyelectrolyte | Cannot filter. | Cannot filter. |

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electric cable having a core of a plurality of insulated conductors and a jacket, the area between the conductors and within the jacket being at least partially filled with a particulate water-swellable, water-insoluble polymer which comprises:

(a) from about 15% to about 50% by weight of an olefinically-unsaturated carboxylic acid containing an activated carbon-to-carbon olefinic double bond and at least one carboxy group;

(b) from about 49.07% to about 82% by weight of an alkyl acrylate wherein the alkyl group has from 1 to 6 carbon atoms; and (c) from about 0.03% to about 3.0% by weight of a crosslinking agent which are polyunsaturated polymerizable vinyl monomers containing two or more free radical polymerizable ethylenic groups, said crosslinking agent being introduced directly into the carbon-carbon backbone of the polymer.

2. The electrical cable of claim 1 in which the polymer comprises from about 20% to about 40% by weight of the olefinically-unsaturated carboxylic acid selected from the group consisting of methacrylic acid and acrylic acid; from about 59.02% to about 78% by weight of an alkyl acrylate selected from the group consisting of methyl acrylate, ethyl acrylate and n-butyl acrylate; and about 0.08% to about 2% by weight crosslinking agent.

3. The electrical cable of claim 1 wherein the polymer is contained in an absorbent wrapping comprising an absorbent layer containing up to 90% by weight of said particulate water-swellable, water-insoluble polymer.

* * * * *